E. V. CROWELL.
PLUG.
APPLICATION FILED MAY 22, 1922.
Reissued Dec. 5, 1922. 15,501.
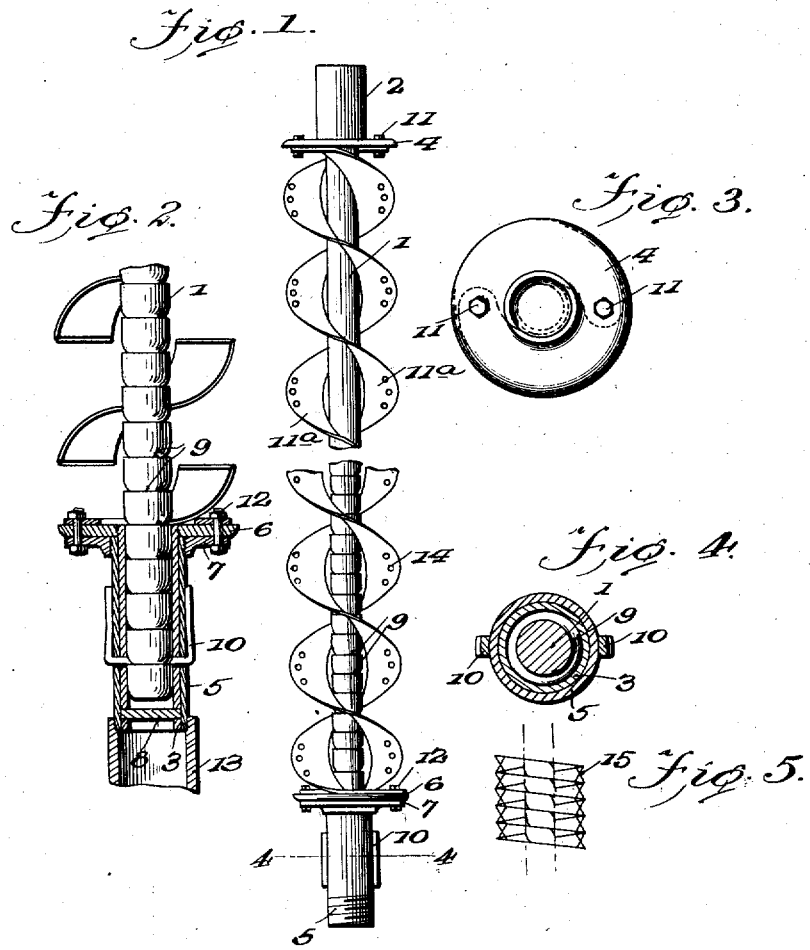
WITNESSES
INVENTOR
E. V. Crowell,
BY
ATTORNEYS Reissued Dec. 5, 1922. Re. 15,501

UNITED STATES PATENT OFFICE.

ERD. V. CROWELL, OF TULSA, OKLAHOMA, ASSIGNOR, BY MESNE ASSIGNMENTS, OF ONE-HALF TO THE GUIBERSON CORPORATION, A CORPORATION OF DELAWARE.

PLUG.

Original No. 1,330,430, dated February 10, 1920, Serial No. 285,845, filed March 28, 1919. Application for reissue filed May 22, 1922. Serial No. 562,849.

*To all whom it may concern:*

Be it known that I, ERD. V. CROWELL, a citizen of the United States, and a resident of Tulsa, in the county of Tulsa and State of Oklahoma, have invented certain new and useful Improvements in Plugs, of which the following is a specification.

My invention is an improvement in plugs, and has for its object to provide a device of the character specified especially adapted for providing a water-tight seal at the bottom of a well bore for the purpose of shutting off a flow of water from below, wherein the arrangement is such that the plug may be introduced through the well casing and expanded at the desired point below the casing to seal the well bore at this point.

In the drawings:

Figure 1 is a front view of the improved plug in expanded condition;

Figure 2 is a vertical section with the parts in contracted position;

Figure 3 is a top plan view of the plug;

Figure 4 is a section on the line 4—4 of Figure 1;

Figure 5 is a diagrammatic view showing the manner of arranging the reinforcing wire.

As is known, when water underlies oil and in the same sand, with no impervious strata to separate the water bearing part of the sand from the productive part of the sand, the water will interfere with the production of the oil sand by flooding the sand with water from below. This water is generally under a high pressure and has great erosive power. An opening admitting a small amount of water will be rapidly eroded to admit more water and the flow will become gradually less in percentage of oil and greater in percentage of water. The water, having the greatest erosive force, will fight for and win first place at the outlet provided by the well.

In order to properly seal the well to shut off this objectionable flow of water the bore of the well must be filled completely, with a substantial plug of plastic material capable of hardening, held out against the wall of the well under heavy lateral pressure, so that the pore spaces and variations in diameter of the latter will be thoroughly and closely filled.

In the present embodiment of the invention, a core 1 is provided, of steel or other suitable material, and upon each end of this core is arranged a sleeve 2 and 3, respectively. The sleeve 2 has a flange 4 at its lower end and the sleeve 3 is encircled by a shell. The upper ends of the lower sleeve and shell are externally threaded and each is engaged by a washer 6 and 7, respectively. The core is slidable through the sleeve 3 and a transverse partition 8 is provided at the lower end of the sleeve for holding the core from movement downward through the sleeve until pressure is brought upon the core to drive it through the partition.

The sleeve 2 constitutes a head for driving the core through the sleeve 3, and the core has annular grooves 9, which are adapted to be engaged by the inwardly extending ends of resilient dogs 10 secured to the shell 5 and extending through registering openings in the shell and sleeve to engage the grooves of the core. Referring to Figure 1, it will be noted that these grooves have upwardly facing shoulders, the upper walls of the grooves being inclined to permit the dogs to slip smoothly over said walls.

Spiral vanes 11 are arranged between the flange 4 and the washer 6, each vane being of a length to extend from the flange 4 to the washer 6 when the flange and the washer are separated to the desired degree. These vanes are connected at their ends to the flange and to the washers 6 and 7 by bolts and nuts 11 and 12, respectively, and the intermediate portions of the vanes are free, the vanes being connected at their ends only. It is obvious that when the flange is moved toward the washers 6 and 7 the pitch of the vanes will be lessened, and the aggregate width from the outer edges of the vanes to the center or axis of the core will be increased. Thus the outer edges of the vanes which are sharpened are caused to bite into the wall of the well opening and to make lateral pressure toward the said walls, digging themselves in and gripping positively the walls of the well.

In use, the plug arranged as shown in Figure 1 is lowered into the well, and when in proper position the anchor pipe 13 which may be of suitable length, engages the bottom of the well. The tools are used to force the head or sleeve 2 toward the sleeve 3, and as the core moves through the sleeve 3 the dogs engage the grooves 9 and prevent reverse movement of the core. The vanes grip the well wall, and after the device is in proper position cement or other packing may be introduced, as much being added as may be desired. In practice, while lowering the packing material it is advisable to mix ordinary fuel oil with the cement.

It will be understood that in the event there is a water bearing stratum below the productive oil strata separated from the oil strata by an impervious stratum, and the impervious stratum should be penetrated by the drill, a bottom hole plug would be necessary to prevent the water from invading the oil sand. It will be noticed that both ends of the shell 5 are threaded, the lower end for the anchor pipe. This anchor pipe, indicated at 13, in practice not only acts to properly position the plug, but, being embedded in the cement serves to anchor the plug. In the usual practice, the plug will be loaded with a cement or packing material placed in between the spirals before it is lowered, although it is obvious that this may be done afterward. A better result is obtained by lowering the packing with the plug.

In order to provide a means for holding a sealing medium in the spiral vanes, a number of openings 14 are provided in the edges of the spirals which serve as an anchorage for the sealing medium, and through which wires 15 may be run if desired, to better anchor the sealing medium, as shown in Figure 5. The preferred form of sealing means is oakum saturated with thin cement mixture, wrung out about half dry and then tied in the spiral vane. The plug, after being loaded with the sealing mixture and attached to the anchor pipe of proper length, constitutes a complete plug in one direction, giving it the power to automatically and properly position itself in the well and to seal or plug the hole at the desired point.

I claim:

1. A device of the character specified comprising a core, a head at one end of the core, a sleeve at the other end through which the core is adapted to move, said core and sleeve having interengaging means for preventing reverse movement of the core with respect to the sleeve, a series of vanes extending between the sleeve and the head spirally of the core and connected at their ends to the head and the sleeve to be expanded when the head is moved toward the sleeve and to bite into the wall of a well opening upon such expansion, frangible means for normally preventing downward movement of the core with respect to the sleeve, the interengaging means between the sleeve and the core comprising dogs on the sleeve and teeth on the core for engagement by the dogs to prevent upward movement of the core with respect to the sleeve and to permit free downward movement.

2. A device of the character specified comprising a core, a head at one end of the core, a sleeve at the other end through which the core is adapted to move, said core and sleeve having interengaging means for preventing reverse movement of the core with respect to the sleeve, a series of vanes extending between the sleeve and the head spirally of the core and connected at their ends to the head and the sleeve to be expanded when the head is moved toward the sleeve and to bite into the wall of a well opening upon such expansion, and frangible means for normally preventing downward movement of the core with respect to the sleeve.

3. A device of the character specified comprising a core, a head at one end of the core, a sleeve at the other end through which the core is adapted to move, said core and sleeve having interengaging means for preventing reverse movement of the core with respect to the sleeve, a series of vanes extending between the sleeve and the head spirally of the core and connected at their ends to the head and the sleeve to be expanded when the head is moved toward the sleeve and to bite into the wall of a well opening upon such expansion, the interengaging means between the sleeve and the core comprising dogs on the sleeve and teeth on the core for engagement by the dogs to prevent upward movement of the core with respect to the sleeve and to permit free downward movement.

4. A device of the character specified comprising a core, a head at one end of the core, a sleeve at the other end through which the core is adapted to move, said core and sleeve having interengaging means for preventing reverse movement of the core with respect to the sleeve, and a series of vanes extending between the sleeve and the head spirally of the core and connected at their ends to the head and the sleeve to be expanded when the head is moved toward the sleeve and to bite into the wall of a well opening upon such expansion.

5. A device of the character specified comprising a core provided at one end with a head, a sleeve at the other end through which the core is movable, spirally arranged vanes extending between the sleeve and the head about the core and adapted to be expanded when the sleeve and head are moved together and to bite into the wall of a well opening upon such expansion, and frangible means for normally preventing movement of the sleeve toward the head.

6. A device of the character specified comprising a core provided at one end with a head, a sleeve at the other end through which the core is movable, spirally arranged vanes extending between the sleeve and the head about the core and adapted to be expanded when the sleeve and head are moved together and to bite into the wall of a well opening upon such expansion, and means for preventing reverse movement of the sleeve with respect to the head.

ERD. V. CROWELL.